United States Patent
Sunkara et al.

(10) Patent No.: US 6,523,032 B1
(45) Date of Patent: Feb. 18, 2003

(54) SERVICING DATABASE REQUESTS USING READ-ONLY DATABASE SERVERS COUPLED TO A MASTER DATABASE SERVER

(75) Inventors: Ramu V. Sunkara, Foster City, CA (US); Xiaoli Zheng, San Mateo, CA (US)

(73) Assignee: Oracle Corporation, Redwood Shores, CA (US)

( * ) Notice: Subject to any disclaimer, the term of this patent is extended or adjusted under 35 U.S.C. 154(b) by 0 days.

(21) Appl. No.: 09/569,514

(22) Filed: May 12, 2000

(51) Int. Cl.[7] .............................................. G06F 17/30
(52) U.S. Cl. ............................ 707/8; 707/10; 707/201; 709/211
(58) Field of Search .............................. 707/10, 8, 201; 709/105, 208, 210, 211

(56) References Cited

U.S. PATENT DOCUMENTS

| | | | | |
|---|---|---|---|---|
| 5,581,753 A | * | 12/1996 | Terry et al. .................. | 707/201 |
| 5,586,310 A | * | 12/1996 | Sharman ...................... | 707/10 |
| 5,664,170 A | * | 9/1997 | Taylor .......................... | 709/220 |
| 5,963,945 A | * | 10/1999 | Pal .............................. | 707/10 |
| 6,009,427 A | * | 12/1999 | Wolff ........................... | 707/10 |
| 6,330,560 B1 | * | 12/2001 | Harrison et al. ............... | 707/8 |

OTHER PUBLICATIONS

Dewitt et al., Parallel database Systems: The Future of High Performance Database Systems, Communications of the ACM, Jun. 1992, vol. 35 No. 6, pp. 85–98.*
Schnor et al., Scalability of Multicast based Synchronization Methods, Proceedings 24th Euromicro Conference, Aug. 1998, vol. 2, pp. 969–975.*

* cited by examiner

Primary Examiner—Greta Robinson
(74) Attorney, Agent, or Firm—Park, Vaughan & Fleming LLP

(57) ABSTRACT

One embodiment of the present invention provides a system that speeds up an application by allowing database tables associated with the application to be partitioned across N read-only slave database servers. In this way, each slave database server can process 1/Nth of the workload of the application. Since this processing can take place in parallel, the system can potentially speed up the application by a factor of N. The system includes a master-slave database hierarchy, which includes a plurality of read-only database servers for servicing read operations and a master database server for servicing both read operations and write operations. This master database server contains an entire database and the plurality of read-only database servers contain local read-only copies of portions of the database. The system operates by receiving a database request from an application server at a read-only database server.

34 Claims, 3 Drawing Sheets

SERVICING DATABASE REQUESTS USING READ-ONLY DATABASE SERVERS COUPLED TO A MASTER DATABASE SERVER

BACKGROUND

1. Field of the Invention

The present invention relates to databases in distributed computing systems. More specifically, the present invention relates to a method and an apparatus for servicing database requests using a plurality of read-only database servers for servicing read operations and a master database server for servicing both read operations and write operations.

2. Related Art

The rise of the Internet has lead to exponential growth in the number of people who are navigating through web sites on the world wide web. Popular web sites commonly receive millions of visitors each day who generate many millions of page hits.

An application hosting web site can potentially receive far greater volumes of traffic, because an application hosting web site can potentially receive accesses from millions visitors accessing thousands of different applications that can potentially be hosted on the application hosting web site.

In order to support such high volumes of traffic, a web site typically employs multiple web/application servers that operate in parallel to process the traffic through the web site. This allows the capacity of the web site to be increased by simply increasing the number of web/application servers that are processing the traffic. In fact, some web sites presently employ hundreds of web servers that operate in parallel to process the traffic.

Unfortunately, throughput cannot similarly be increased for accesses to database servers. Web servers typically access a single database server to retrieve and manipulate data related to transactions conducted through the web site. For example, a web site that performs sales transactions can read data from an inventory database on a database server to determine which items are available to sell, and can record financial transactions into a financial database on the database server. However, adding additional databases servers does not automatically provide more database throughput because data cannot be replicated across multiple database servers without creating consistency problems.

As traffic through web sites continues to increase, the number of web/application servers can be increased. However, the number of database servers cannot be correspondingly increased. Hence, accesses to database servers can become a bottleneck to overall system performance.

In order to remedy this problem, it is possible to partition a database into a number of sections that are distributed between multiple database servers. This solution can work for applications in which different web/application servers access completely unrelated sections of the database. However, if a number of web/application servers concurrently access the same section of the database, they will concurrently access the same database server, which again creates a bottleneck.

What is needed is a method and an apparatus that provides additional database capacity beyond the capabilities of a single database server without creating consistency problems for the database.

SUMMARY

One embodiment of the present invention provides a system that speeds up an application by allowing database tables associated with the application to be partitioned across N read-only slave database servers. In this way, each slave database server can process 1/Nth of the workload of the application. Since this processing can take place in parallel, the system can potentially speed up the application by a factor of N. The system services database requests by using a plurality of read-only database servers for servicing read operations and a master database server for servicing both read operations and write operations. This master database server contains an entire database and the plurality of read-only database servers contain local read-only copies of portions of the database. The system operates by receiving a database request from an application server at a read-only database server. If servicing the request involves performing only read operations, the system performs the read operations on a local read-only copy of a portion of the database. If servicing the request involves performing a write operation, the system sends the write operation to the master database server, and allows the master database server to apply the write operation to the database.

In one embodiment of the present invention, the system receives an update from the master database server reflecting changes to the database caused by the write operation. The system applies this update to the local read-only copy of the portion of the database.

In one embodiment of the present invention, after sending the write operation to the master database server, the system invalidates data affected by the write operation within the local read-only copy of the portion of the database.

In one embodiment of the present invention, invalidating the data involves invalidating a table containing the data.

In one embodiment of the present invention, if a data item to be read is not present in the local read-only copy of the portion of the database, the system retrieves the data item from the master database server, and stores the data item in the local read-only copy of the portion of the database.

One embodiment of the present invention provides a system for servicing database requests using a plurality of read-only database servers for servicing read operations and a master database server for servicing both read operations and write operations. In this system, the master database server contains a database and the plurality of read-only database servers contain local read-only portions of the database. The system partitions the database workload data into a plurality of subsets, and then associates the subsets with a plurality of read-only database servers. Next, the system executes an application that processes the database workload on a plurality of application servers that communicate with the plurality of read-only database servers associated with the plurality of subsets. If servicing a request involves performing a write operation, the system sends the write operation from a read-only database server to the master database server, and allows the master database server to apply the, write operation to the database.

In one embodiment of the present invention, the system additionally identifies portions of the database that are associated with an application, and sends the portions of the database to the plurality of read-only database servers associated with the application during system initialization so that requests from the workload will be directed to the plurality of read-only database servers.

In one embodiment of the present invention, partitioning the database workload involves distributing workload data from the master database server to the plurality of read-only database servers at run time.

In one embodiment of the present invention, a given read-only database server only receives a portion of the database workload from associated applications.

In one embodiment of the present invention, executing the application in the plurality of application servers involves executing different instances of the same application on the plurality of application servers. In a variation on this embodiment, the different instances of the same application operate on different portions of the database workload.

Hence, the present invention provides additional database processing capacity in a scalable way that overcomes the capacity limitations of prior architectures that make use of a single database server to service multiple middle-tier application servers. This scaling results from using multiple read-only "slave" database servers to perform operations in parallel with the master database server.

Unlike cluster-based architectures, there is no limit to the number of database servers that can operate together in processing an application. Note that the configuration of the present invention is a hierarchical master-slave arrangement, and not peer-to-peer as in a clustered computing system. In one embodiment of the present invention, this master-slave arrangement is built on top of a network of computers coupled together by a very high-bandwidth, low-latency local network. Also note that by using the present invention it is possible to use database servers from many different hardware vendors.

Applications that can be well-partitioned benefit the most from the present invention. An application can be well-partitioned if the data for the application can be partitioned into identifiable subsets for each partition of the application. For example, applications such as customer relationship management (CRM) applications, ecommerce applications, online service applications, network file systems, enterprise resource planning (ERP) applications and hosting applications tend to be well-partitioned.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital video discs), and computer instruction signals embodied in a transmission medium (with or without a carrier wave upon which the signals are modulated). For example, the transmission medium may include a communications network, such as the Internet.

Distributed Computing System

Figure 1:
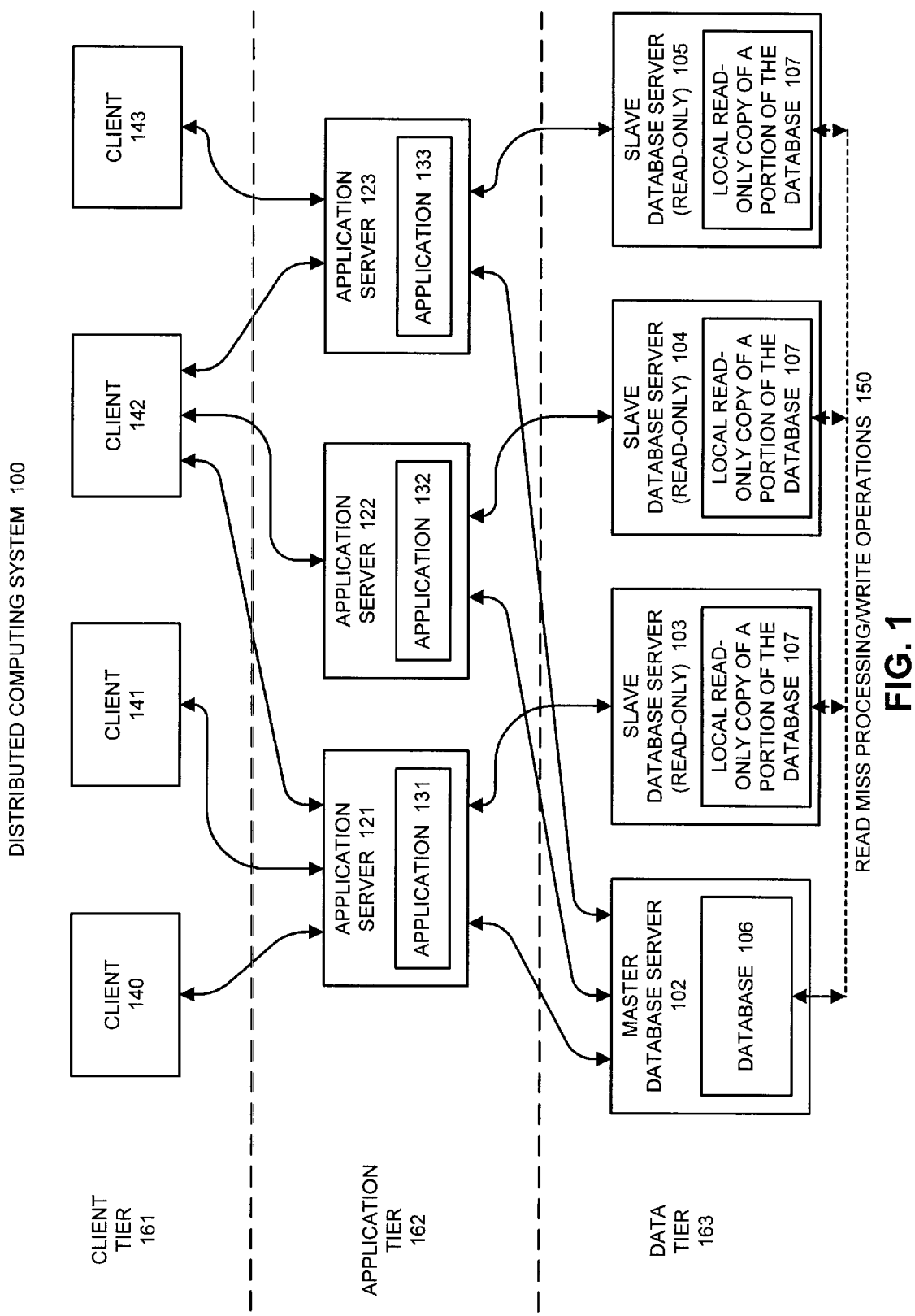
FIG. 1 illustrates a distributed computing system in accordance with an embodiment of the present invention.

FIG. 1 illustrates a distributed computing system 100 in accordance with an embodiment of the present invention. Distributed computing system 100 is structured around a classic three-tier architecture, including a client tier 161, an application tier 162 and a data tier 163. Client tier 161 includes clients 140–143.

Clients 140–143 can include any node, on a network including computational capability and including a mechanism for communicating across the network with application servers 121–123. In one embodiment of the present invention, clients 140–143 contain web browsers (not shown). These web browsers can include any type of web browser capable of viewing a web site, such the INTERNET EXPLORER™ browser distributed by the Microsoft Corporation of Redmond, Wash.

Clients 140–143 communicate with application servers 121–123 within application tier 162 in order to make use of applications 131–133, respectively. Application servers 121–123 can include any nodes on a computer network including a mechanism for servicing requests from a client for computational and/or data storage resources. Applications 131–133 can include any type of applications running on application servers 121–123, respectively. In one embodiment of the present invention, applications 131–133 implement a web site that communicates with web browsers located within clients 140–143.

Note that clients 140–143, application servers 121–123 and database servers 102–105 communicate with each other through a network (not shown). This network can include any type of wire or wireless communication channel capable of coupling together computing nodes. This includes, but is not limited to, a local area network, a wide area network, or a combination of networks. In one embodiment of the present invention, the network includes the Internet.

Application servers 121–123 are associated with database servers 102–105 in data tier 163. Database servers 102–105 include master database server 102 and slave database servers 103–105. Master database server 102 contains database 106, whereas slave database servers 103–105 contain local read-only copies 107–109 of portions of database 106.

Note that write operations that are generated by slave database servers 103–105 are sent to master database server 102. This prevents consistency problems. Slave database servers 103–105 can process database read operations locally.

During operation, the system illustrated in FIG. 1 operates generally as follows. A workload is dynamically distributed between database servers 102–104. Next, the corresponding computational tasks are executed on application servers 121–123. Note that any database write operations generated by the computational tasks are propagated to database 106 on master database server 102. Also note that updated versions of data values in database 106 may eventually be propagated back to slave database servers 103–105. If a data value to be read is not present in slave database server 103, a read miss is sent to master database server 102 for processing. This causes the data value to be loaded from master database server 102 into the slave database server 103. Note that an application server 121 generally only communicates to master database server 102 directly if application server 121 cannot communicate with its corresponding slave database server 103.

Executing a Computational Task in Parallel

Figures 2, 3:
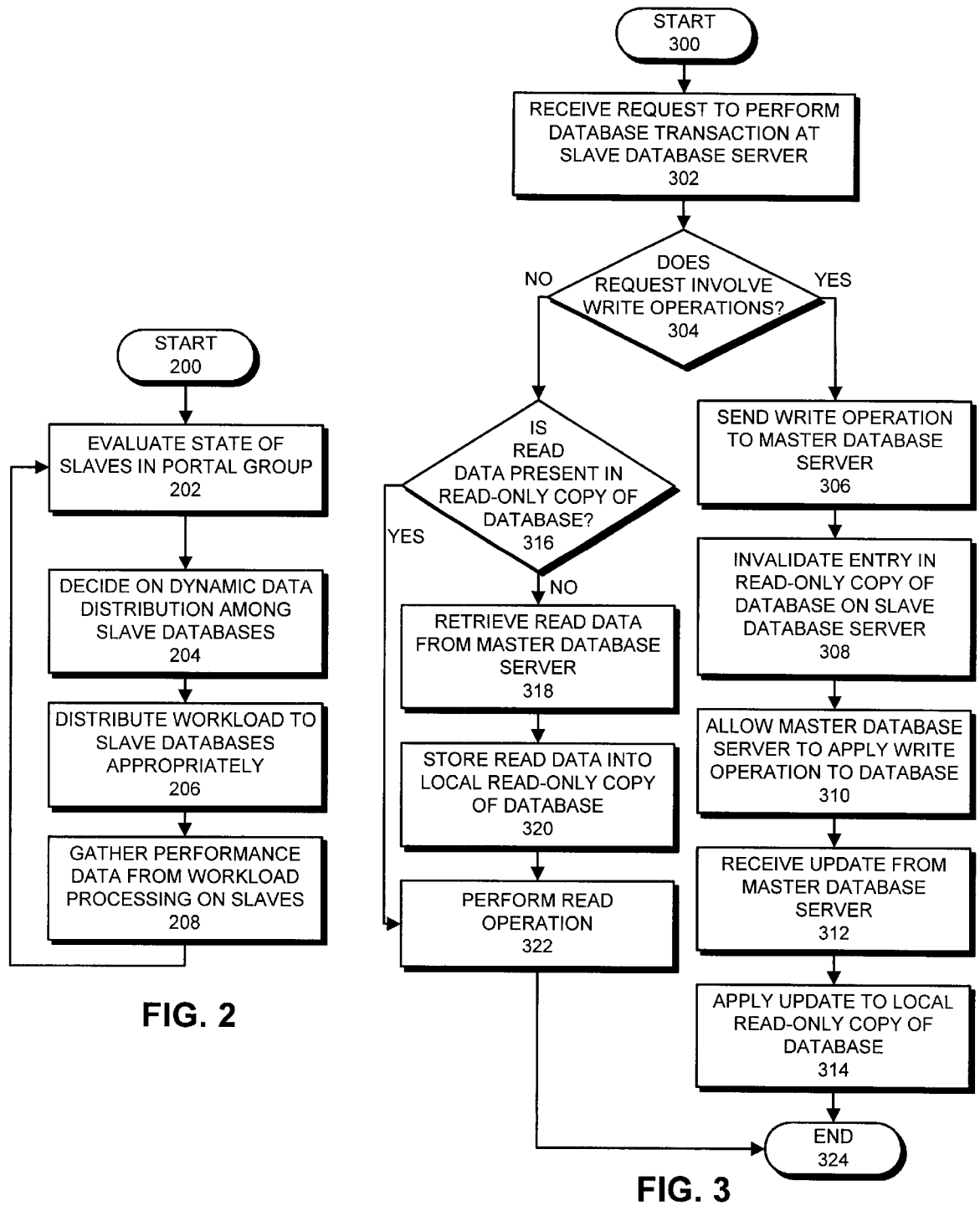
FIG. 2 is a flow chart illustrating the process of dynamically distributing workload data between slave databases in accordance with an embodiment of the present invention.
FIG. 3 is a flow chart illustrating the process of servicing a database request on a slave database server in accordance with an embodiment of the present invention.

FIG. 2 is a flow chart illustrating the process of dynamically distributing workload data between slave databases in accordance with an embodiment of the present invention. The system starts by evaluating the state of slaves 103–105 in a portal group (step 202). Based upon the state of the slaves 103–105, the system decides on a distribution of a workload between slave databases 103–105 (step 204). For example, in a mass mailing application, the system can distribute ⅓ of the workload to each of the three slaves 103–105.

Next, the system distributes the workload between slave databases 103–105 (step 206). After application servers 121–123 have executed their respective versions of the application, which generate accesses to associated slave database servers 103–104, the system gathers performance data on the workload processing on slaves 103–105 (step 208). The system then returns to step 202 to continue workload processing.

In the embodiment of the present invention illustrated in FIG. 1, master database server 102 handles all database write operations. This means that when slave database servers 103–105 receive a request to perform a database write operation, the request is sent to master database server 102. After master database server 102 performs the write operation, the value that is written during the write operation can be propagated back to slave database servers 103–105 as required.

Note that the present invention readily provides support for Basic Availability Serialized Eventually (BASE) operation with a high-level of performance. Note that Atomic, Consistent, Isolated and Durable (ACID) operation can also be supported, but with a lower level of performance.

In order to provide for ACID operation, the results of write operations on master database server 102 have to propagate back to slave database servers 103–105 before subsequent read operations can take place at slave database servers 103–105. Alternatively, the system can use a two-phase commit mechanism between master database server 102 and slave database servers 103–105. Either one of these options can take additional time, and can hence reduce performance.

Operation of Slave Database Server

FIG. 3 is a flow chart illustrating the process of servicing a database request on a slave database server 103 in accordance with an embodiment of the present invention. Slave database server 103 first receives a database request from application 131 on application server 121 (step 302). The system determines if processing the request involves performing database write operations (step 304).

If processing the request does not involve performing database write operations, only database read operations are involved. Hence, the request can be processed by accessing the local read-only copy 107 of the database. In this case, the system determines if the data to be read is present in local read only copy 107 (step 316). If so, the system processes the request, which involves performing the read operations from local read-only copy 107 (step 322).

If the data to be read is not present in local read only copy 107 of the database, the system retrieves the data to be read from database 106 on master database server 102 (step 318). Next, the system stores the data to be read within local read only copy 107 (step 320), and then processes the request, which involves performing the read operations (step 322). In one embodiment of the present invention, retrieving the data to be read involves retrieving an entire table that contains the data from database 106 within master database server 102.

If processing the request involves performing database write operations, the request (or the resulting write operation) is sent to master database server 102 (step 306).

In one embodiment of the present invention, after sending the write operation to master database server 102, the system invalidates a corresponding entry within the local read-only copy 107 of the database so that a stale value will not be read from local read-only copy 107 (step 308). In one embodiment of the present invention, this invalidation process involves invalidating an entire table containing the data to be written.

Next, the system allows master database server 102 to perform the write operation (step 310). In one embodiment of the present invention, slave database server 103 receives an update from master database server 102 specifying the changes that were made by the write operation (step 312), and these changes are applied to the local read-only copy 107 of the database so that the local read-only copy 107 is consistent with database 106 within master database server 102 (step 314).

Figure 4:
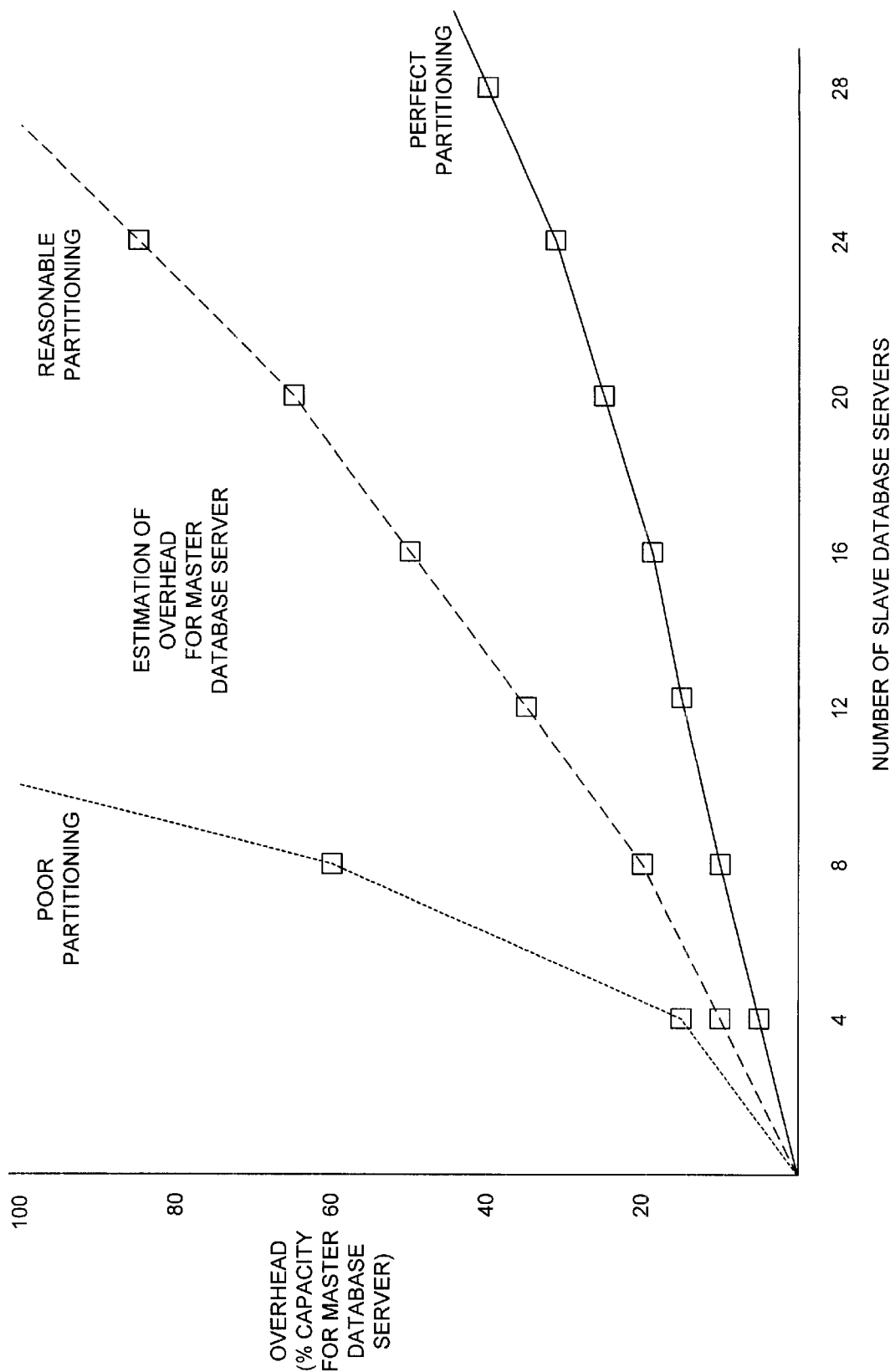
FIG. 4 is a graph illustrating how master database server overhead is affected by different partitionings of a computational workload in accordance with an embodiment of the present invention.

Note that the present invention operates best if the application can be well-partitioned across slave database servers. The graph in FIG. 4 illustrates how the capacity of master database server 102 is utilized for different partitionings of a computational workload across slave database servers. A poor partitioning results in master database server 102 becoming overloaded while servicing just a few slave nodes, whereas a perfect partitioning allows more slave nodes to be utilized without swamping master database server 102.

Also note that a typical application only accesses a small portion of the database. This small portion of the database is put into a set of slave databases, and the application is associated with the set of slaves. This causes all requests from the application to go to the set of slaves. This procedure of putting portions of the database into slaves is called static data partitioning, and is done only once when the system warms up.

At run-time, the workload data (ex. orders) is distributed from the master database to a set of slave databases. A slave only gets a portion of the entire workload data and only processes this portion of the workload data. This procedure of putting portions of the workload data into slaves is called dynamic data partitioning, and is done regularly when the system is running.

From the database's point of view, a workload from an application is a set of database requests (reads and writes). A slave only gets a portion of the workload of associated applications. The slaves run in parallel so the whole system speeds up.

Note that the data within database 106 can typically be divided into read mostly data and updated data. Read mostly data is statically partitioned and replicated to slaves, whereas, the updated data is dynamically partitioned between slaves. The slaves send change requests for the updated data to the master database server, which makes the changes and periodically sends the changes back to the appropriate slaves.

The foregoing descriptions of embodiments of the invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present inven-

What is claimed is:

1. A method for servicing database requests by using a plurality of read-only database servers for servicing read operations and a master database server for servicing both read operations and write operations, wherein the master database server contains an entire database and the plurality of read-only database servers contain local read-only copies of portions of the database, the method comprising:
   receiving a database request at a read-only database server, the database request being received from an application server;
   if servicing the database request involves performing only read operations, performing the read operations on a local read-only copy of a portion of the database;
   if servicing the database request involves performing a write operation,
      sending the write operation to the master database server, and
      allowing the master database server to apply the write operation to the database.

2. The method of claim 1, wherein additional read-only database servers can be added in a scalable manner.

3. The method of claim 1, further comprising:
   receiving an update from the master database server reflecting changes to the database caused by the write operation; and
   applying the update to the local read-only copy of the portion of the database.

4. The method of claim 1, wherein after sending the write operation to the master database server, the method further comprises invalidating data affected by the write operation within the local read-only copy of the portion of the database.

5. The method of claim 4, wherein invalidating the data involves invalidating a table containing the data in the local read-only copy of the portion of the database.

6. The method of claim 1, wherein if a data item to be read is not present in the local read-only copy of the portion of the database, the method further comprises:
   retrieving the data item from the master database server; and
   storing the data item in the local read-only copy of the portion of the database.

7. A method for servicing database requests using a plurality of read-only database servers for servicing read operations and a master database server for servicing both read operations and write operations, wherein the master database server contains an entire database and the plurality of read-only database servers contain local read-only portions of the database, the method comprising:
   receiving a database workload that manipulates data within the database;
   partitioning the database workload into a plurality of subsets;
   associating the plurality of subsets with a plurality of read-only database servers;
   executing an application that processes the database workload on a plurality of application servers that communicate with the plurality of read-only database servers associated with the plurality of subsets;
   wherein if servicing a database request involves performing a write operation,
      sending the write operation from a read-only database server to the master database server, and
      allowing the master database server to apply the write operation to the database.

8. The method of claim 7, further comprising:
   identifying portions of the database that are associated with an application;
   sending the portions of the database to the plurality of read-only database servers associated with the application during system initialization so that requests from the workload will be directed to the plurality of read-only database servers.

9. The method of claim 7, wherein partitioning the database workload involves distributing workload data from the master database server to the plurality of read-only database servers at run time.

10. The method of claim 7, wherein a given read-only database server only receives a portion of the database workload from associated applications.

11. The method of claim 7, wherein executing the application in the plurality of application servers involves executing different instances of the same application on the plurality of application servers.

12. The method of claim 11, wherein the different instances of the same application operate on different portions of the database.

13. The method of claim 11, wherein an application that is written to operate using a single database server does not have to be modified to operate using the plurality of read-only database servers.

14. A computer-readable storage medium storing instructions that when executed by a computer cause the computer to perform a method for servicing database requests by using a plurality of read-only database servers for servicing read operations and a master database server for servicing both read operations and write operations, wherein the master database server contains an entire database and the plurality of read-only database servers contain local read-only copies of portions of the database, the method comprising:
   receiving a database request at a read-only database server, the database request being received from an application server;
   if servicing the database request involves performing only read operations, performing the read operations on a local read-only copy of a portion of the database;
   if servicing the database request involves performing a write operation,
      sending the write operation to the master database server, and
      allowing the master database server to apply the write operation to the database.

15. The computer-readable storage medium of claim 14, wherein the method further comprises:
   receiving an update from the master database server reflecting changes to the database caused by the write operation; and
   applying the update to the local read-only copy of the portion of the database.

16. The computer-readable storage medium of claim 14, wherein after sending the write operation to the master database server, the method further comprises invalidating data affected by the write operation within the local read-only copy of the portion of the database.

17. The computer-readable storage medium of claim 16, wherein invalidating the data involves invalidating a table containing the data in the local read-only copy of the portion of tho database.

18. The computer-readable storage medium of claim 14, wherein if a data item to be read is not present in the local read-only copy of the portion of the database, the method further comprises:

retrieving the data item from the master database server; and storing the data item in the local read-only copy of the portion of the database.

19. The computer-readable storage medium of claim 14, wherein additional read-only database servers can be added in a scalable manner.

20. A computer-readable storage medium storing instructions that when executed by a computer cause the computer to perform a method for servicing database requests using a plurality of read-only database servers for servicing read operations and a master database server for servicing both read operations and write operations, wherein the master database server contains an entire database and the plurality of read-only database servers contain local read-only portions of the database, the method comprising:

receiving a database workload that manipulates data within the database;

partitioning the database workload into a plurality of subsets;

associating the plurality of subsets with a plurality of read-only database servers;

executing an application that processes the database workload on a plurality of application servers that communicate with the plurality of read-only database servers associated with the plurality of subsets;

wherein if servicing a database request involves performing a write operation, sending the write operation from a read-only database server to the master database server, and allowing the master database server to apply the write operation to the database.

21. The computer-readable storage medium of claim 20, wherein the method further comprises:

identifying portions of the database that are associated with an application;

sending the portions of the database to the plurality of read-only database servers associated with the application during system initialization so that requests from the workload will be directed to the plurality of read-only database servers.

22. The computer-readable storage medium of claim 20, wherein partitioning the database workload involves distributing workload data from the master database server to the plurality of read-only database servers at run time.

23. The computer-readable storage medium of claim 20, wherein a given read-only database server only receives a portion of the database workload from associated applications.

24. The computer-readable storage medium of claim 23, wherein the plurality of sub-tasks are different instances of the same application.

25. The computer-readable storage medium of claim 24, wherein the different instances of the same application operate on different portions of the database.

26. The computer-readable storage medium of claim 23, wherein an application that is written to operate using a single database server does not have to be modified to operate using the plurality of read-only database servers.

27. An apparatus that services requests for database operations, comprising:

a master database server for servicing both read operations and write operations;

a database within the master database server;

a read-only database server for servicing read operations in communication with the master database server, wherein the read-only database server contains, a read-only copy of a portion of the database from the master database server; and a write processing mechanism that sends write operations to the master database server so that the master database server can apply the write operations to the database.

28. The apparatus of claim 27, further comprising a second read-only database server in communication with the master database server.

29. The apparatus of claim 27, wherein the read-only database server additionally includes an updating mechanism that is configured to:

receive an update from the master database server reflecting changes to the database caused by a write operation; and to apply the update to the read-only copy of the portion of the database.

30. The apparatus of claim 27, wherein the read-only database server additionally includes an invalidation mechanism that is configured to invalidate data affected by a write operation within the read-only copy of the portion of the database.

31. The apparatus of claim 30, wherein the invalidation mechanism is configured to invalidate a table containing the data in the local read-only copy of the portion of the database.

32. The apparatus of claim 27, wherein the read-only database server additionally includes a retrieving mechanism wherein if a data item to be read is not present in the read-only copy of the portion of the database, the retrieving mechanism is configured to:

retrieve the data item from the master database server; and to store the data item in the read-only copy of the portion of the database.

33. The apparatus of claim 27, further comprising an application server in communication with the read-only database server, wherein the application server is configured to execute an application that accesses the read-only database server.

34. The apparatus of claim 27, wherein additional read-only database servers can be added in a scalable manner.

* * * * *